April 17, 1934.　　　J. C. STIMSON　　　1,955,105
HIGHWAY SIGNAL
Filed March 3, 1926　　2 Sheets-Sheet 1
Fig. 1.
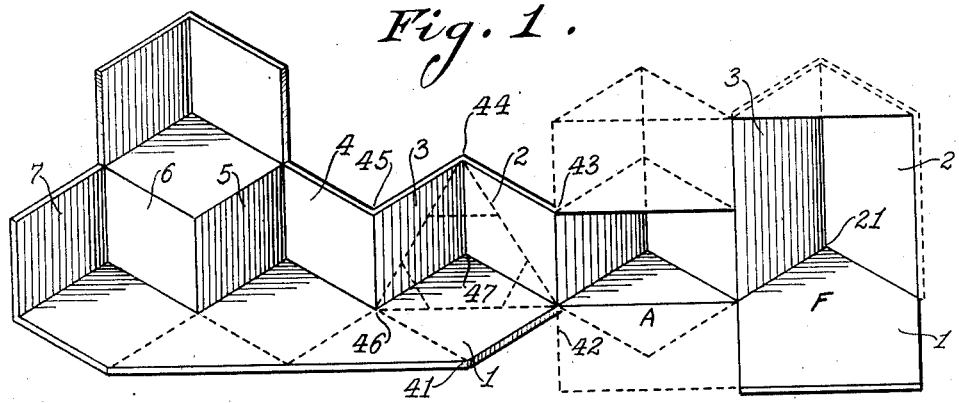
Fig. 2.
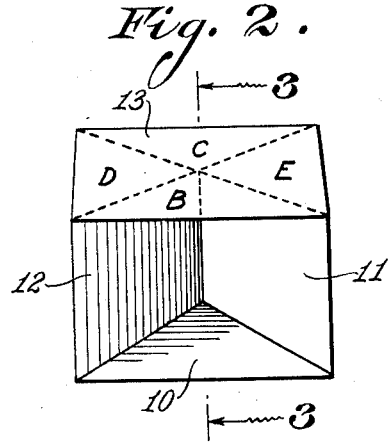
Fig. 3.
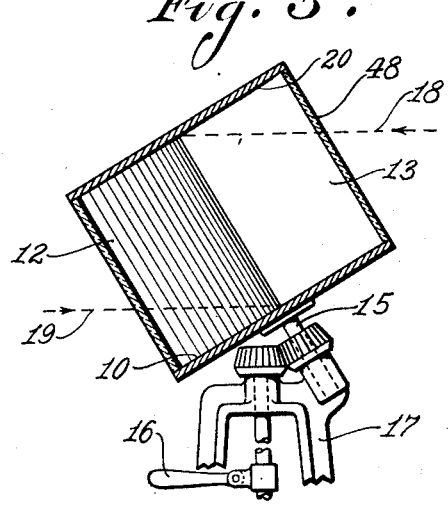
Fig. 4.
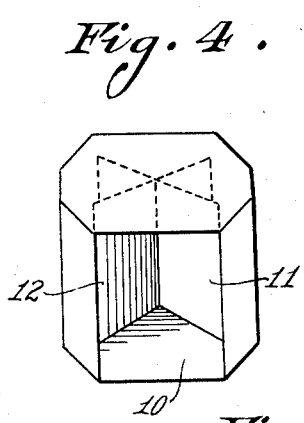
Fig. 5.
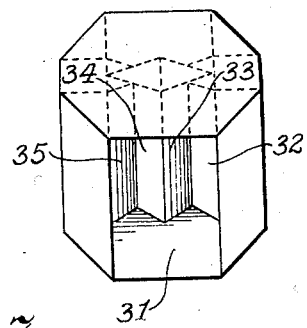
Fig. 6.
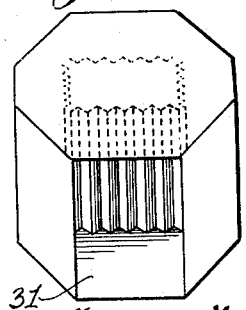
Fig. 7.
Inventor:
JONATHAN C. STIMSON,
By
His Attorney.

April 17, 1934.   J. C. STIMSON   1,955,105
HIGHWAY SIGNAL
Filed March 3, 1926   2 Sheets-Sheet 2

Inventor:
Jonathan C. Stimson,
By John W. Brunings
His Attorney.

Patented Apr. 17, 1934

1,955,105

UNITED STATES PATENT OFFICE 1,955,105

HIGHWAY SIGNAL

Jonathan C. Stimson, St. Louis, Mo.

Application March 3, 1926, Serial No. 92,025

8 Claims. (Cl. 88—1)

This invention pertains to reflecting devices more particularly as applied to highway signals. This application is a continuation in part of application Serial No. 7164 filed February 5th, 1925, (now Patent No. 1,591,572).

If three reflecting surfaces are arranged to intersect at a common point with the reflecting surfaces at right angles to each other, so as to form in effect the corner of a cube, the diagonal of the cube being designated the axis of the reflector, then a beam which impinges on one of the reflecting surfaces from any one of a wide variety of inclinations to the axis, is reflected from surface to surface about the axis or center of the device and emerges back along the incident beam; it may, therefore, be called a central triple reflector. Where the reflecting surfaces are the three square faces of a cube, then the aperture is wholly active for the reflection of beams normal thereto.

The practical value of the central triple reflector system for signals arises from its property of directing emerging beams back along the direction of incident beams even when they have varying inclinations to the axis. As incorporated in a signal the axis of the reflector is customarily directed toward the path of a moving light source, and the properties of the reflector with respect to beams which are parallel, or nearly parallel to the axis, are of most importance. In describing the invention, therefore, beams normal to the aperture and parallel to the axis are considered typical.

In the central triple reflector heretofore incorporated in signals, a plane surface cannot bound the aperture formed by the three square faces of a cube; and a signal, to be enclosed and practical, requires a fourth surface to complete the structure. Instead, the reflector used in signals has been the diagonal corner of a cube, the shape of the reflector surfaces being isosceles triangles and the aperture an equilateral triangle. In signalling reflectors of the hollow type the aperture was bounded and the structure enclosed by a plane cover glass. If a solid glass structure was used the form was a tetrahedron with a plane, triangular shaped surface bounding the aperture.

Such a reflector is not compact in form when used singly and is not wholly active for the reflection of normal beams, whether used singly or in series to form a multiple unit reflector. The three extremities of the equilateral triangular aperture, totaling one-third of the area of the aperture, are inactive since rays do not emerge from these areas so as to be directed back along the incident beams.

One of the objects of this invention, therefore, is to provide a practical reflecting signal with an aperture which is totally effective for the reflection of normal beams.

Another object is to provide a reflecting signal of compact form, simple and cheap to construct and easy to maintain in repair.

Further objects will appear from the following description taken in connection with the accompanying drawings, in which:

Figure 1 is a front view of a series of reflector units illustrating a central triple reflector and the development of various embodiments of this invention;

Figure 2 is a front view of a railway signal embodying this invention;

Figure 3 is a section on line 3—3 of Figure 2;

Figures 4, 5 and 6 are diagrammatic views showing several different embodiments of this invention;

Figure 7 is a fragmentary view illustrating a composite reflector plate;

Figure 8:
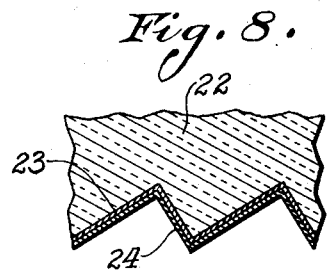
Figure 8 is a cross-sectional view illustrating one method of constructing a reflector.

In the middle of Figure 1 is illustrated a central triple reflector composed of three square reflecting surfaces 1, 2 and 3, positioned at right angles to each other and meeting at point 47 in the center of the reflector. The aperture is a regular hexagon 41, 42, 43, 44, 45, 46, and the axis of the reflector is the diagonal of the cube; that is, a line indicated by the central point 47 and extending so as to form equal angles with the reflecting surfaces.

Any normal beam impinging upon one of the reflecting surfaces within the limits of the hexagonal shaped aperture will be successively reflected by the three surfaces and emerge in a parallel but opposite direction to the impinging beam from a point on the opposite side of the axis from the incident beam and equisitant from the axis. Thus a ray entering at the point 41 will emerge at the point 44, directly opposite the axis 47, and equidistant therefrom. Since all points within the aperture have a corresponding point on the opposite side of, and equidistant from the axis, it follows that the entire aperture is effective for the reflection of normal beams.

In making reflector signals the reflecting faces may be plane silvered glass or metal surfaces forming the hollow corner of a cube, with a plane cover glass enclosing the structure; or a solid transparent tetrahedron may be used. However, it is apparent that a plane plate or face passing through the points 41, 43, 45 will not pass through points 42, 44, 46. If the solid type is to be used for a practical reflector, a plane face must be provided perpendicular to the axis, and if the reflector is of the hollow type a plane cover glass to enclose the structure is necessary. Such an enclosing plane must pass through the points 42, 44, 46 limiting the aperture to the equilateral triangle shown by the dotted lines. The total area of this triangular aperture is not effective for the return reflection of normal beams, the extremities of the triangle not having corresponding points on the opposite side of the axis from which the beam can be reflected and emerge. The effective aperture is bounded by the small dotted regular hexagon. This has limited the value, and complicated the construction of reflecting signals in the past.

One improvement for reflecting signals as provided by this invention is a composite reflecting surface which is built up by combining a series of these central triple reflecting units as illustrated in the left-hand portion of Figure 1. Such a combination is made by bringing together a series of similar units side by side, and similarly oriented. Thus by adding the reflecting surfaces 4, 5, 6 and 7, three reflecting units are produced which have the surface 1 in common. In other words, the surface 1 forms one of the reflecting faces for each of three reflector units; the faces 2—3, 4—5, and 6—7 being at right angles to each other, in pairs, and all perpendicular to the face 1. The full aperture of this central triple reflector is not disturbed and the combined apertures merge to form one continuous aperture.

The reflecting faces of these units may be of any suitable construction for the purpose. They may be plane plates of glass or other material, silvered on the front or rear, or they may be the total reflecting surfaces of a prismatic solid. A particularly valuable form is the solid pressed glass reflector of Figures 9 and 10, the means of providing a plane entrance and exit surface for the rays without altering the square surfaces of the central triple reflecting units being apparent. This reflector is disclosed in the above mentioned patent, and comprises a series of reflector units having reflecting faces 1 to 7 inclusive, corresponding to those of Figure 1. In this case the units are arranged in successive tiers, each tier having a common reflecting surface, all in one plane, as the surfaces 8, 9, etc.

As previously described, the hexagonal aperture of the central triple reflector 1, 2, 3, Figure 1, cannot be incorporated in a signal as a single unit with a plane surface bounding the aperture and enclosing the structure. Directly to the right of unit 1, 2, 3, Figure 1, is shown at A a means of modifying or framing the hexagonal aperture so that an aperture which is rectangular in shape is formed. This rectangular aperture is entirely effective for the return reflection of normal beams since any point within its boundary has a corresponding point on the opposite side of the axis and equi-distant from it.

A signaling device particularly valuable as a railroad switch signal and incorporating this principle is shown in Figures 2 and 3. A reflector similar to that shown at A is shown in Figure 2. This signal structure consists of four central triple reflectors arranged back to back and facing in four different directions. Each reflector comprises a lower reflecting face 10 and side-faces 11 and 12. These are arranged at right angles to each other. The sides 11 and 12 are extended beyond their meeting line as shown at 13 and 14, to form the reflecting faces of the other three reflectors. This reflector is mounted for rotation on an angular axis 15 so as to be rotated by a switch-arm 16 during the operation of throwing the switch. The whole may be mounted on a suitable pedestal 17 in accordance with the usual practice.

It will be seen that any or all of the four apertures may be completely enclosed by placing plane, rectangular shaped cover glasses over the openings forming the boundaries of the apertures without restricting the aperture in any way. One of such cover glasses is shown at 48 (Fig. 3) and it acts to protect the reflecting surfaces against the elements.

When mounted in this way, the reflector provides a signaling device. The oppositely faced reflecting units are oriented so that their axes extend along the track in order that the beam of light falling thereon from the headlight of an approaching locomotive may be reflected back so as to be visible by the engineer. The tilting of the axis 15 of rotation, provides that the axes 18 and 19 of the reflecting units may remain horizontal. The left-hand unit of Figure 3 has a lower reflecting face 10 and two side faces, 11 and 12, while the right-hand unit has an upper reflecting face 20 and two side faces 13 and 14, only one of the side faces being shown in each case. It will be noted that when this unit is in one position, say with the reflecting units B and C facing along the track, only these units are active as signals, since the other two units D and E are faced cross-wise of the track. By rotating the device through a right angle on its axis 15, the units D and E will be brought into active position and B and C to inactive position. It will be clear, therefore, that by giving the reflecting units of the two pairs different colors, as, for instance, by constructing the reflecting faces of tinted glass, a signaling device of the usual significance may be provided. For instance, the unit B and C might be tinted green, and the units D and E red; such colors indicating the way in which the switch is thrown.

With the reflector arranged as at A, Figure 1, an aperture is obtained which is somewhat small vertically for a switch signal. It may be desirable, therefore, to extend the aperture in a vertical direction. This may be done by extending the reflecting surfaces as indicated in dotted lines at A, and as shown in full lines at F. The arrangement at F is obtained by simply extending the reflecting surfaces 2 and 3 in a vertical direction to the desired extent. The lower face 1 should also be extended forwardly to such an extent that the axis of the reflector, through the point 21, is located in the center of the aperture. With this construction the aperture will still be fully effective as each incident ray will emerge as a reflected ray at a point diametrically opposite to the point of incidence and equidistant from the axis. The reflector unit (switch signal) of Figure 4 is constructed according to Figure 1 at F. In this figure the reflector may be constructed of comparatively large plane reflectors. Another embodiment, following the principle described for Figure 1 in which the surfaces 2—3, 4—5, etc., cooperate with a common perpendicular surface 1, is shown in Figure 5.

Figure 9:
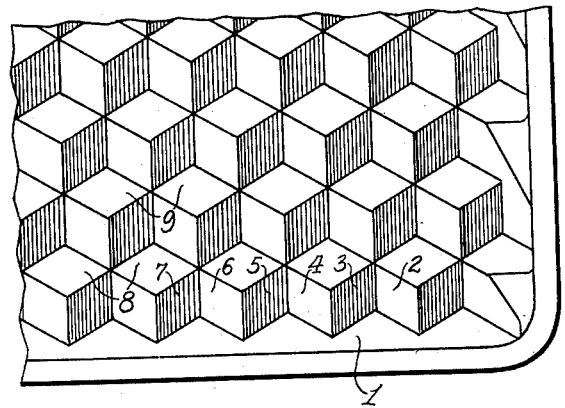
Figure 9 is a front view of a pressed glass reflector composed of a series of central triple reflector units.
Figure 10:
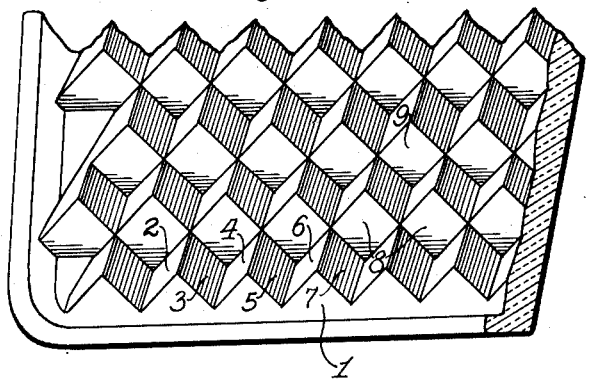
Figure 10 is a rear view of Figure 9.

It will be noted that in Figures 1 and 9, the faces 2—3, 4—5, etc., form a series of parallel V grooves having plane sides at right angles to each other. Taken together these surfaces form a grooved reflector which stands at right angles to the reflector 1 having a plane surface, the grooves of the first reflector running at right angles to the second reflector. The embodiment of Figures 9 and 10 consists simply of a series of such reflectors arranged in tiers with parallel plane surfaces 1, 8, 9, etc., each of which has grooves running at right angles to it, each groove being composed of two plane surfaces 2—3, 4—5, 6—7, etc., placed at right angles to one another. By simply extending both of these reflectors, the embodiments of Figures 5 and 6 are obtained.

In Figure 5 the surfaces 32—33 and 34—35 are alternately at right angles to each other as in the case of the surfaces 2—3, 4—5, etc., and are extended in a vertical direction as indicated at F, Figure 1. The reflecting surface 31 cooperates with all of the surfaces, 32—33 and 34—35, being at right angles thereto. This arrangement forms a pair of central triple reflectors arranged side by side and the whole unit has a rectangular aperture. Figure 6 illustrates the natural extension of this principle by simply multiplying the number of grooves formed by pairs of surfaces, such as 32 and 33, the faces of such grooves forming right angled reflecting surfaces cooperating with a common single plane surface 31 to form a compound reflector made up of a grooved reflector and a plane reflector at right angles thereto.

While the embodiments of Figures 4 and 5 form effective units for railway signal work, a unit may be constructed on the principle of Figure 6. The rear reflector may in such a case be formed of pressed glass as indicated in Figure 7. In this case the flat side of the plate of Figure 7 is turned toward the incident beam. The hollow type of reflector as shown in Figures 4 and 5 may also be constructed as suggested in Figure 8 in which 22 is a matrix upon which a coating 23 of silver or other reflecting medium is deposited, after which a body coating 24 of copper or other suitable material may be deposited thereon by plating or otherwise. The matrix may have the shape of the grooves of Figures 6 or 7, or the cubical surfaces of Figures 9 and 10.

The coloring of these signals may be accomplished by constructing any one or more of the reflecting faces of tinted glass. If one of the reflecting faces of Figures 4, 5 or 6 is of tinted glass silvered on the back, the light must traverse the coloring screen in passing between the grooved and the plane reflectors, while if the faces of the grooves be tinted, the light will traverse the coloring screen both in its passage between the grooved and the plane reflectors and in its passage from face to face of a groove. If the reflectors of Figures 7, 9 and 10 be constructed of pot-colored glass, the light will traverse the coloring screen both between the grooved and the plane reflectors and between faces of any groove. A slight tinting is, therefore, sufficient to give a decided color to the reflected beam.

It will be seen, therefore, that this invention provides a simple and effective reflector for highway signals. By means of a central triple reflector incorporated in a signaling device so as to form a rectangular shaped aperture, a self-contained, completely enclosed and easily constructed signalling device is secured which secures maximum efficiency. The grooved reflector, having its groove faces at right angles to each other and all these faces being perpendicular to and facing the plane reflector, makes each element a central triple reflector with a rectangular shaped aperture and having extended faces. It will be clear that this is the same construction as Figure 9, obtained by taking the lower row of triple reflecting units and extending all the faces upwardly and downwardly to equal extents. The construction lends itself easily to processes for making the prismatic pressed glass type of reflector. This is a cheap process and the finished unit reflects from its interior faces by total reflection, requiring no silver film or other reflecting surface which must be protected from the elements.

Whether the pressed glass prismatic type of reflectors or reflectors of the hollow type are used, it is to be understood that the reflector element has the general characteristic of returning light back toward the source from a variety of angular positions in front of the device, and more specifically may be made as disclosed in Patent No. 1,671,086 issued May 22, 1928, or Patent No. 1,743,834, issued January 14, 1930, so that light impinging upon the reflector from a distant source will be reflected in the general direction of the light source; means being provided in the reflector in accordance with the descriptions in the above mentioned patents which will slightly spread the reflected light with substantial uniformity throughout its field of spread, so as to direct a slightly spreading beam back toward and visible to an observer located a substantial distance outside of a line connecting the reflector with the light source.

It is obvious that various changes may be made in the details of construction without departing from the spirit of this invention; it is to be understood, therefore, that this invention is not limited to the specific details shown and described.

Having thus described the invention, what is claimed is:

1. A central triple reflector having two of its surfaces extended along their meeting edge and having the third surface extended rectangularly in the direction transverse thereto, and means cooperating with said surfaces to provide a rectangular aperture.

2. A highway signal, comprising, a plurality of reflectors each consisting of a series of central triple reflectors having their reflecting surfaces arranged in adjacent pairs at right angles to each other with a single reflecting plane surface perpendicular to said first surfaces, said reflectors facing in different directions, and means for mounting said reflectors adapted to permit facing any reflector in a given direction.

3. A highway signal, comprising, a plurality of reflectors each consisting of a series of central triple reflectors having their reflecting surfaces arranged in adjacent pairs at right angles to each other with a single reflecting plane surface perpendicular to said first surfaces, said reflectors facing in different directions, and means for mounting said reflectors for rotation on an inclined axis.

4. A central triple reflector having three intersecting surfaces relatively at right angles, and means cooperating with said surfaces to provide a rectangular aperture.

5. A reflector having intersecting surfaces relatively at right angles to provide a series of contiguous central triple reflectors, and means cooperating with said surfaces to provide a rectangular aperture.

6. A reflecting device of the character described, comprising, a pair of reflecting surfaces arranged relatively at approximately right angles, and a pair of substantially parallel reflecting surfaces intersecting said first pair at approximately right angles to their meeting edges.

7. A reflecting device of the character described, comprising, a pair of reflecting surfaces crossing one another at approximately right angles, and a pair of substantially parallel reflecting surfaces intersecting said first pair at approximately right angles to their meeting edges.

8. A highway signal, comprising, a plurality of central triple reflectors facing in different directions, each of said triple reflectors comprising a pair of reflecting surfaces relatively arranged at approximately right angles and a pair of substantially parallel reflecting surfaces intersecting said first pair at approximately right angles to their meeting edge, and means for mounting said reflectors for rotation on an axis inclined to the vertical, said axis being parallel to the meeting edge of said first pair of reflecting surfaces.

JONATHAN C. STIMSON.